(12) United States Patent
Facklam

(10) Patent No.: US 8,171,667 B2
(45) Date of Patent: May 8, 2012

(54) BEAR TRAP WITH SAFETY DOOR

(76) Inventor: Robert Facklam, Choteau, MT (US)

( * ) Notice: Subject to any disclaimer, the term of this patent is extended or adjusted under 35 U.S.C. 154(b) by 461 days.

(21) Appl. No.: 12/658,008

(22) Filed: Mar. 27, 2009

(65) Prior Publication Data

US 2010/0242338 A1  Sep. 30, 2010

(51) Int. Cl.
*A01M 23/20* (2006.01)
*A01M 23/16* (2006.01)
*A01M 23/00* (2006.01)

(52) U.S. Cl. ..................... 43/61; 43/58; 43/60

(58) Field of Classification Search ............... 43/61, 60, 43/58, 85
See application file for complete search history.

(56) References Cited

U.S. PATENT DOCUMENTS

| | | | | | |
|---|---|---|---|---|---|
| 74,264 | A | * | 2/1868 | Zaiser | 43/61 |
| 123,807 | A | * | 2/1872 | Bowman | 43/61 |
| 1,139,849 | A | * | 5/1915 | Collins | 43/61 |
| 1,382,416 | A | * | 6/1921 | Dresser | 43/61 |
| 1,524,692 | A | * | 2/1925 | Dick | 43/61 |
| 2,087,646 | A | * | 7/1937 | Houghton | 43/61 |
| 2,488,202 | A | * | 11/1949 | Kern | 43/61 |
| 2,544,026 | A | * | 3/1951 | Kern et al. | 43/61 |
| 2,573,228 | A | * | 10/1951 | Slauth | 43/61 |
| 3,426,470 | A | * | 2/1969 | Rudolph | 43/61 |
| 4,187,634 | A | * | 2/1980 | Kintz | 43/61 |
| 4,310,984 | A | * | 1/1982 | Brubaker, Jr. | 43/61 |
| 4,763,439 | A | * | 8/1988 | Smith | 43/61 |
| 4,899,484 | A | * | 2/1990 | Morin | 43/61 |
| 5,345,710 | A | * | 9/1994 | Bitz | 43/61 |
| 5,778,594 | A | * | 7/1998 | Askins et al. | 43/61 |
| 6,164,008 | A | * | 12/2000 | Kelley | 43/61 |
| 6,178,686 | B1 | * | 1/2001 | Batman | 43/61 |
| 6,202,340 | B1 | * | 3/2001 | Nieves | 43/61 |
| 6,445,301 | B1 | * | 9/2002 | Farrell et al. | 43/61 |
| 6,484,436 | B1 | * | 11/2002 | Chang | 43/61 |
| 6,484,672 | B1 | * | 11/2002 | Versaw | 43/61 |
| 6,609,327 | B2 | * | 8/2003 | Stoico et al. | 43/61 |
| 6,618,982 | B2 | * | 9/2003 | Lafforthun | 43/61 |
| 6,775,946 | B2 | * | 8/2004 | Wright | 43/61 |
| 7,171,777 | B2 | * | 2/2007 | Welin-Berger | 43/85 |
| 7,509,770 | B2 | * | 3/2009 | Gardner et al. | 43/58 |
| 7,530,195 | B2 | * | 5/2009 | Muller et al. | 43/58 |
| 7,540,109 | B2 | * | 6/2009 | Hall | 43/61 |
| 7,854,088 | B2 | * | 12/2010 | Kurachi | 43/61 |
| 7,918,050 | B2 | * | 4/2011 | Sturgeon et al. | 43/85 |
| 7,930,853 | B2 | * | 4/2011 | Pomerantz | 43/61 |

(Continued)

FOREIGN PATENT DOCUMENTS

DE    102007037275 A1 *  2/2009

(Continued)

*Primary Examiner* — Darren W Ark
(74) *Attorney, Agent, or Firm* — Richard C. Conover

(57) ABSTRACT

A large animal trap including a hollow cylindrical shell having a front end opening. A vertically slidable trap door is positioned to close the front end opening. A trigger mechanism associated with the trap door is provided so that when a bear seizes the bait located within the cylindrical shell, the trigger will allow the trap door to fall closing the front end opening. This animal trap is further provided with a pneumatic braking assembly which stops downward movement of the trap door when an object is within the front end opening. The large animal trap is further provided with structure to allow a user to raise the trap door from a location away from the trap.

3 Claims, 17 Drawing Sheets

U.S. PATENT DOCUMENTS

| | | | |
|---|---|---|---|
| 8,061,076 B2 * | 11/2011 | Kelley | 43/61 |
| 2004/0020100 A1 * | 2/2004 | O'Brien et al. | 43/1 |
| 2005/0097808 A1 * | 5/2005 | Vorhies et al. | 43/61 |
| 2008/0282600 A1 * | 11/2008 | Rich et al. | 43/61 |
| 2009/0094882 A1 * | 4/2009 | Comstock | 43/61 |
| 2009/0293340 A1 * | 12/2009 | Kelley | 43/61 |
| 2011/0119987 A1 * | 5/2011 | Alter et al. | 43/61 |
| 2011/0138676 A1 * | 6/2011 | Moustirats | 43/61 |

FOREIGN PATENT DOCUMENTS

| | | | |
|---|---|---|---|
| JP | 08056549 A * | 3/1996 | |
| JP | 10215752 A * | 8/1998 | |
| JP | 2001128610 A * | 5/2001 | |
| JP | 2001275545 A * | 10/2001 | |
| JP | 2002272351 A * | 9/2002 | |
| JP | 2002272352 A * | 9/2002 | |
| JP | 2003009753 A * | 1/2003 | |
| JP | 2003033134 A * | 2/2003 | |
| JP | 2003116444 A * | 4/2003 | |
| JP | 2003169587 A * | 6/2003 | |
| JP | 2004097019 A * | 4/2004 | |
| JP | 2004121077 A * | 4/2004 | |
| JP | 2004135643 A * | 5/2004 | |
| JP | 2004229559 A * | 8/2004 | |
| JP | 2004305050 A * | 11/2004 | |
| JP | 2005087072 A * | 4/2005 | |
| JP | 2005168473 A * | 6/2005 | |
| JP | 2006136302 A * | 6/2006 | |
| JP | 2007049904 A * | 3/2007 | |
| JP | 2007300847 A * | 11/2007 | |
| JP | 2010268699 A * | 12/2010 | |
| JP | 2011024446 A * | 2/2011 | |

* cited by examiner

BEAR TRAP WITH SAFETY DOOR

This application claims the benefit of provisional application Ser. No. 61/072,089 filed Mar. 27, 2008.

BACKGROUND OF INVENTION

The present invention relates to a bear trap having a main trap door with a trigger mechanism that is tripped to close the main trap door and capture whatever is inside at the time the trigger was activated. The main trap door has an automatic braking system. The system will activate when an object is detected in the path of the door when it is falling to the closed position. This system will automatically stop the door from falling until the object has moved out of the path of the falling door.

Live animal traps are well known such as described in U.S. Pat. No. 4,080,749 to Gilbaugh and U.S. Pat. No. 5,199,210 to Nastas. These animal traps include a rectangular cage closed at one end and having a trap door for closing the open end of the trap when an animal seizes the bait located inside the trap.

The present invention is directed to a large animal trap such as for trapping bears. The trap door used with this trap is very heavy, weighing approximately 80-100 pounds. When the trap door falls under the influence of gravity to close the trap, anything in the trap opening will be hit by the trap door. It has been known that when a mother bear enters the trap, cubs may also follow the mother into the trap. If the trap door falls on the cub, the cub will be severely injured. Further, if a person were located in the opening, and the trap door released accidentally, the person could be severely injured as well.

It is an object of the present invention to provide a bear trap having a safety door which will automatically stop downward movement when an object is detected in the path of the door.

It is a further object of the present invention to provide a bear trap having apparatus for lifting the trap door from a location away from the trap thereby avoiding injury when one gets too close to the trap where a captured animal can scratch or bite.

SUMMARY OF INVENTION

The present invention relates to a bear trap including a horizontally disposed hollow cylindrical shell having a front end opening and an end wall closing the opposite rear end. A pair of upright channel guides are disposed on either side of the opening with each having a vertical channel opening facing one another. A vertically slidable trap door is positioned with its side extremities located in the channel openings. The trap door is adapted to fall by gravity to close the opening. A trigger mechanism associated with the trap door is provided so that when a bear seizes the bait located within the cylindrical shell, the trigger will allow the trap door to fall closing the front end opening. This animal trap is further provided with a pneumatic cylinder having a pneumatic piston movable from an extended position to a retracted position. The pneumatic cylinder is mounted to the trap door and positioned with the pneumatic piston extendable into a channel opening when the pneumatic piston is in the extended position to brake the falling trap door. Further a brake pad is mounted to the free end of the pneumatic piston and a pneumatic valve is provided for selectively directing compressed air from a reservoir to the pneumatic cylinder to move the pneumatic piston to the extended position. A trigger is positioned below the lower extremity of the trap door and is connected to the pneumatic valve for moving the pneumatic piston to the extended position when the trap door is falling and an object located in the front opening of the cylindrical shell pushes the trigger upwardly.

The bear trap according to the present invention further includes an "A" frame mounted to the cylindrical shell over the front end opening. A pulley is mounted to the apex and a rope is secured to the trap door and threaded through the pulley leaving a free end which may be pulled to raise the trap door.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
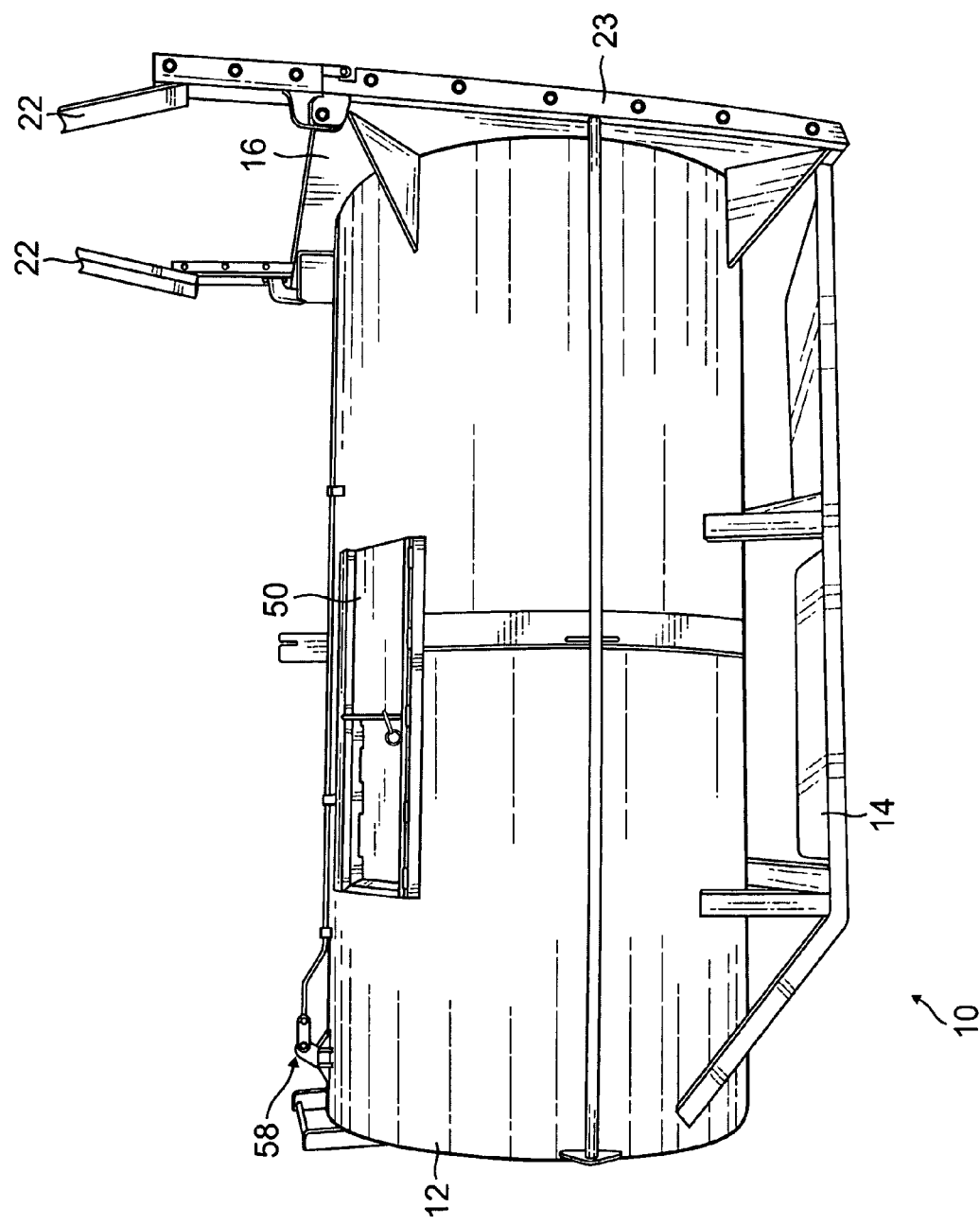
FIG. 1 is a perspective elevational view of a bear trap according to the present invention.
Figure 2:
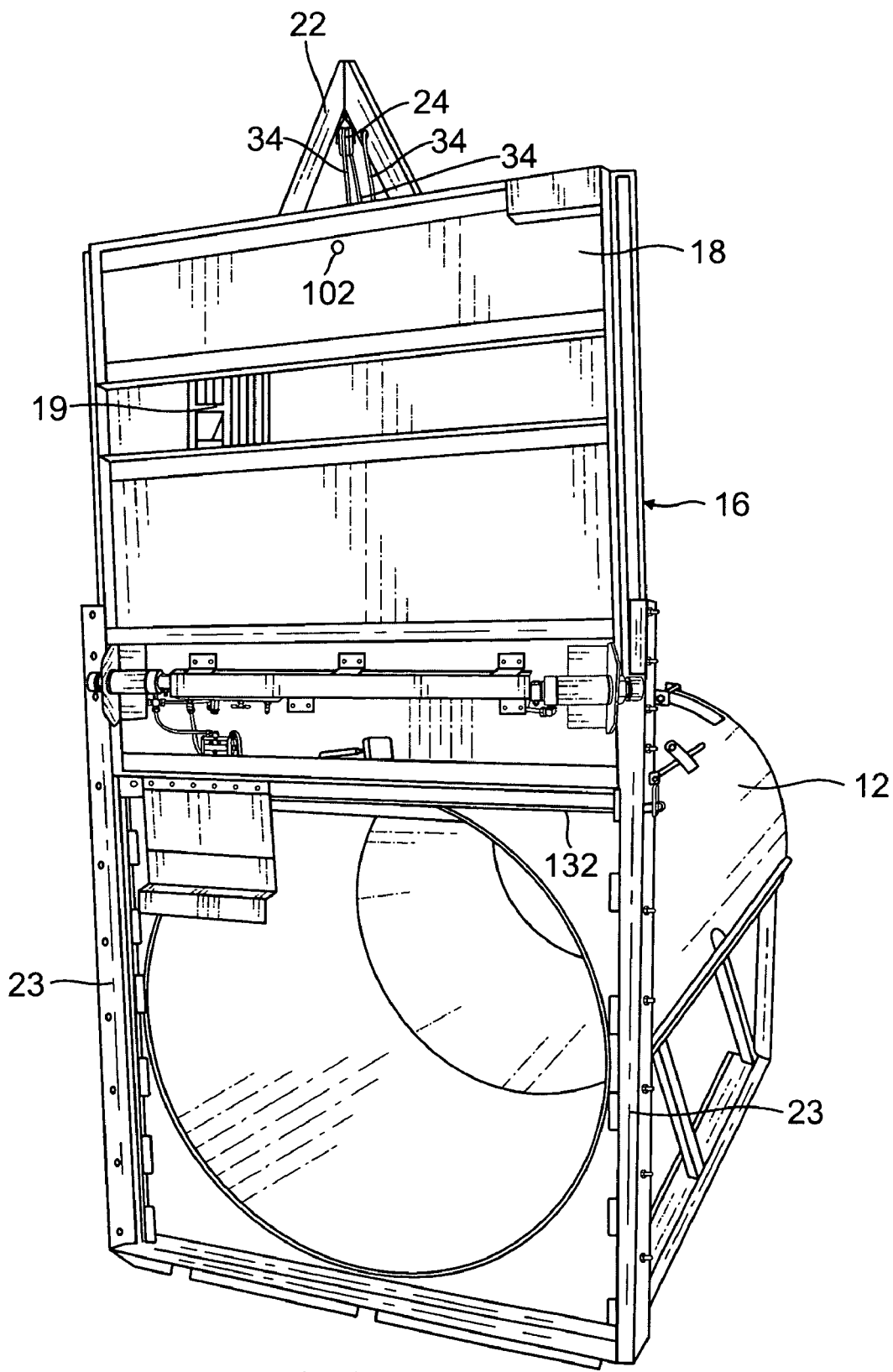
FIG. 2 is a perspective right-side view of the bear trap shown in FIG. 1 with a trap door in a raised position.

A bear trap 10 according to the present invention is shown in FIG. 1. The bear trap 10 includes a hollow cylindrical shell 12. This type of bear trap is known as a "culvert-style" trap and in a preferred embodiment is constructed of aluminum or steel. The cylindrical shell 12 is supported by a framed stand 14. The bear trap 10 includes a trap door 16 as shown in FIGS. 1 and 2. The trap door 16 includes a door panel 18 and a ventilation opening 19.

Figure 3:
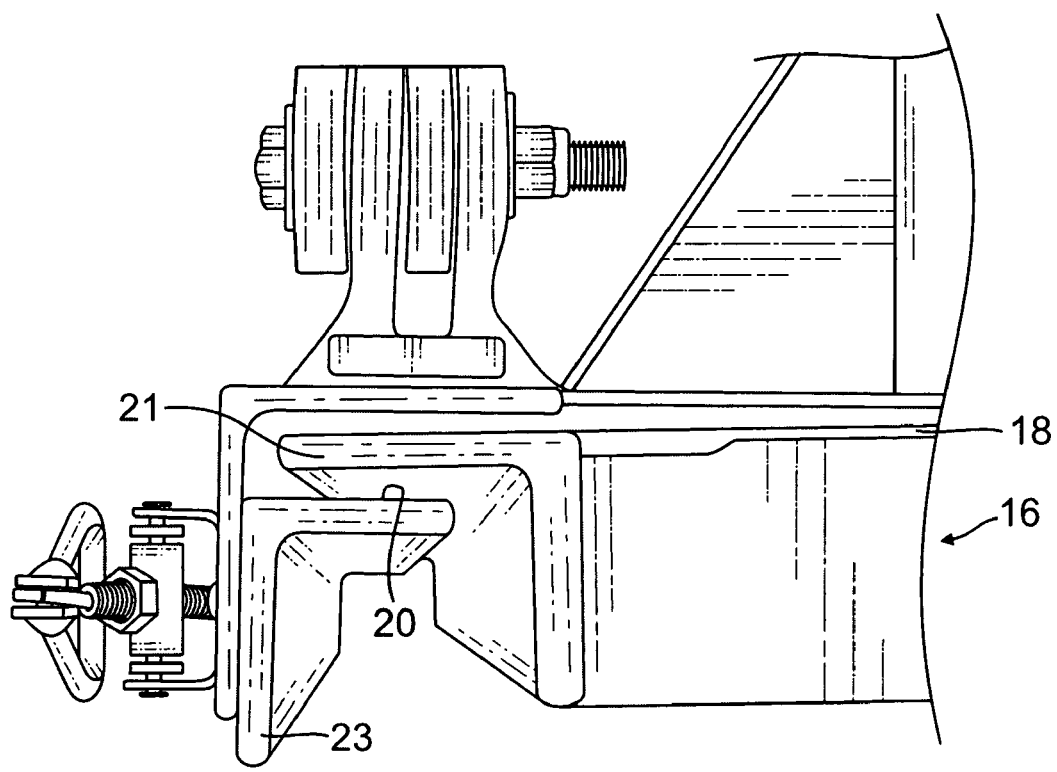
FIG. 3 is a top view of the trap door riding in a channel according to the present invention.
Figure 4:
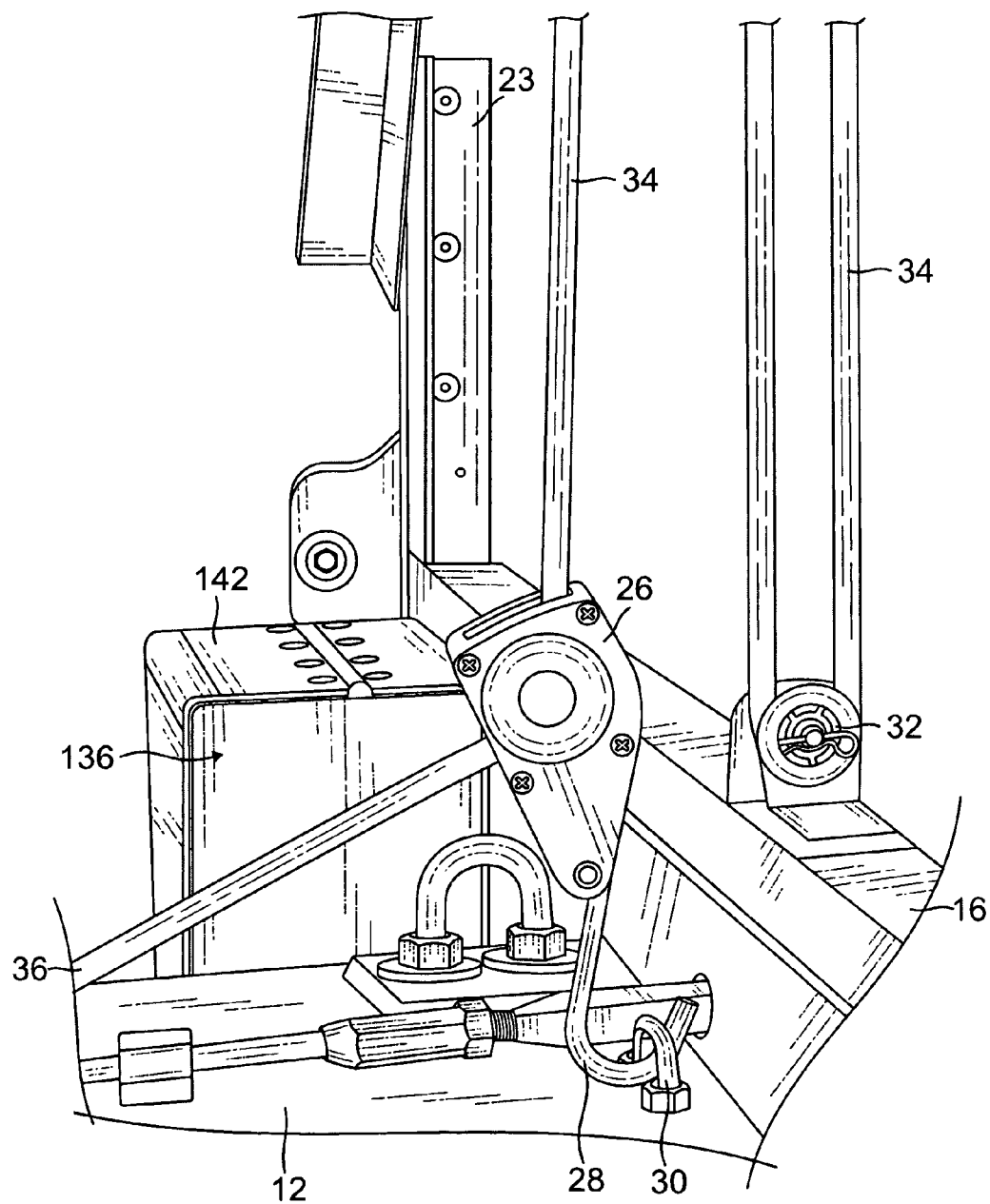
FIG. 4 is a detail perspective view of a pulley system used with the present invention.

Vertical uprights 23 are provided on either side of trap door 16 as shown in FIGS. 1-3. Each of the uprights 23 are provided with vertical channels 20. A vertical flange 21 is provided on each lateral side of trap door 16 and rides in the channels 20 as shown in FIG. 3. In this manner, the trap door 16 slides up and down vertically within the channels 20. FIG. 2 shows the trap door 16 in an upward position thereby providing an entrance into the cylindrical shell 12. An "A"-frame 22 has free ends mounted to the upright channel members 20 as shown in FIG. 1. A pulley 24 is secured to the apex of the "A"-frame 22 as shown in FIG. 2. A second pulley 26, as shown in FIG. 4, has a hook 28 which hooks into a U-bolt 30 mounted to the cylindrical shell 12. A further pulley 32 is secured to the frame of the trap door 16 as shown in FIG. 4. A rope 34 has a free end attached to the apex of the "A"-frame 22 and then is threaded down and around pulley 32, up and around the pulley 24, and then down and around pulley 26, leaving a free end 36 which may be extended to a position distant from the bear trap 10. By pulling on the free end 36 of rope 34, the trap door 16 may be raised to a position as shown in the FIG. 2.

Figure 5:
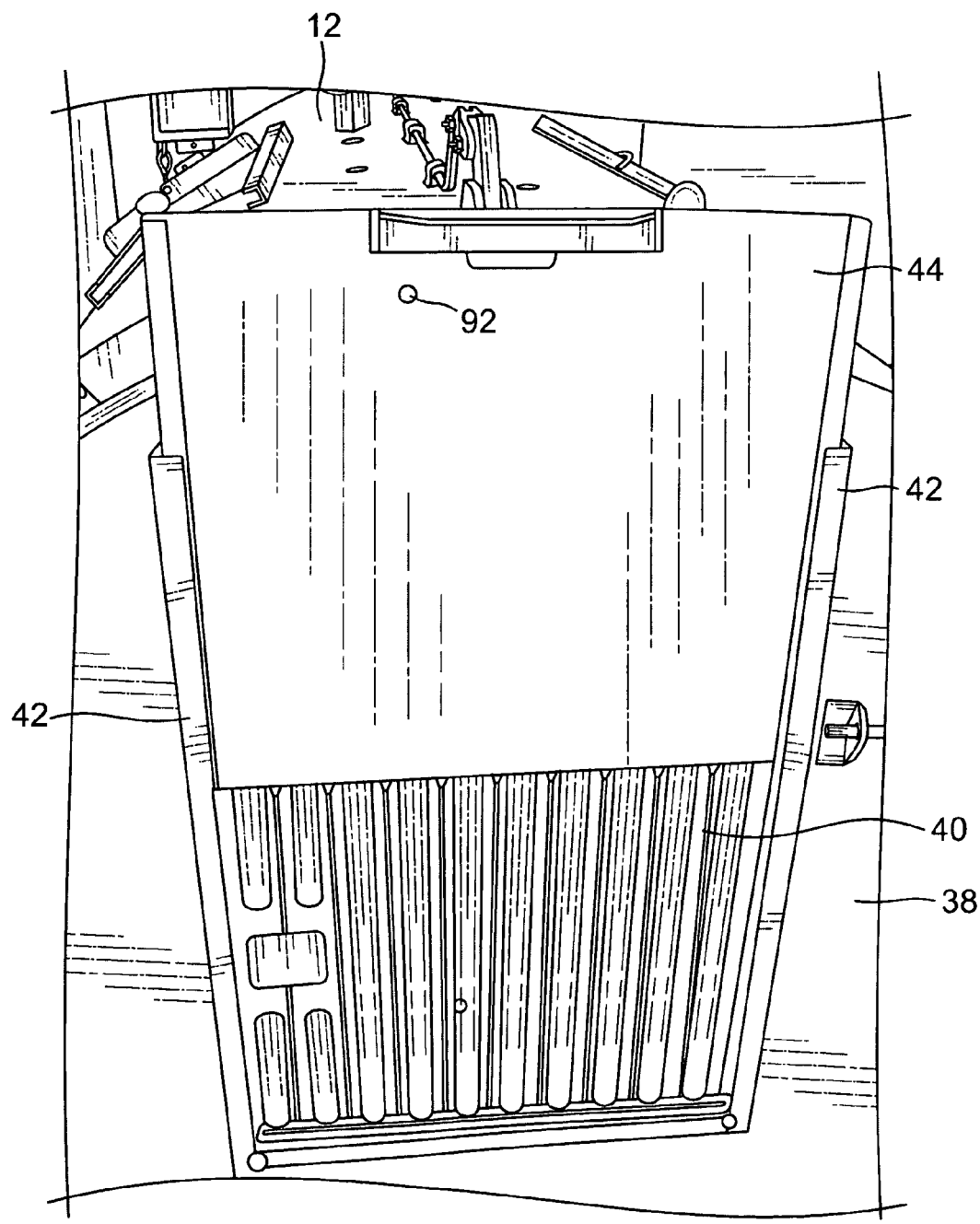
FIG. 5 is a partial left side view of the bear trap shown in FIG. 1.

The rear end of the cylindrical shell 12 is provided with a panel 38 as shown in FIG. 5. The panel 38 includes a barred opening 40. A pair of vertically disposed channel members 42 are provided on either side of the barred opening 40. A rear door panel 44 is sized to slidably move upwardly and downwardly in channel 42.

Figure 6:
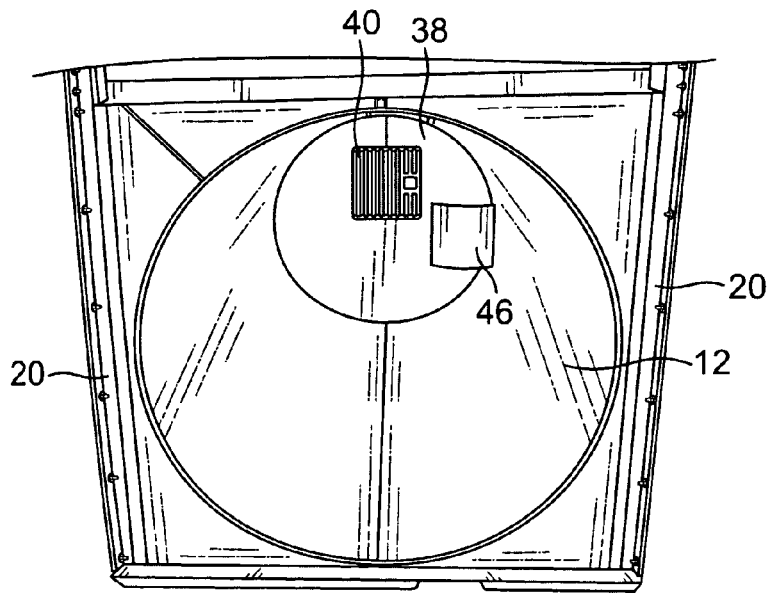
FIG. 6 is a right-side view of the bear trap shown in FIG. 1 with the trap door removed.

A water container 46 is provided inside the cylindrical shell 12 as shown in FIG. 6.

Figure 7:
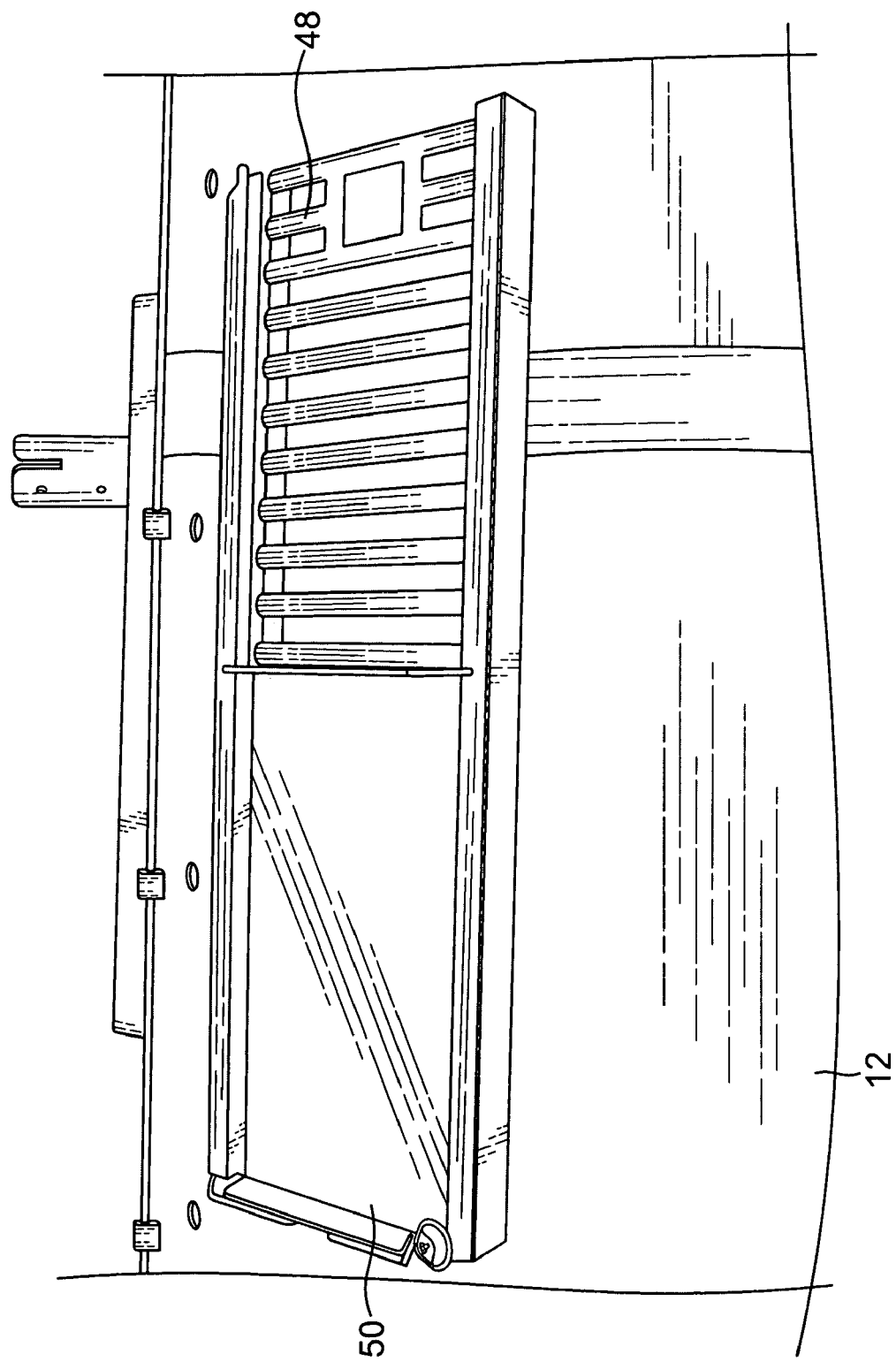
FIG. 7 is a detail view of side window with darting port and blackout cover used with the present invention.

A barred side window 48 is provided in cylindrical shell 12 as shown in FIGS. 1 and 7. A slide cover 50 may be used to close the window 48.

Figure 8:
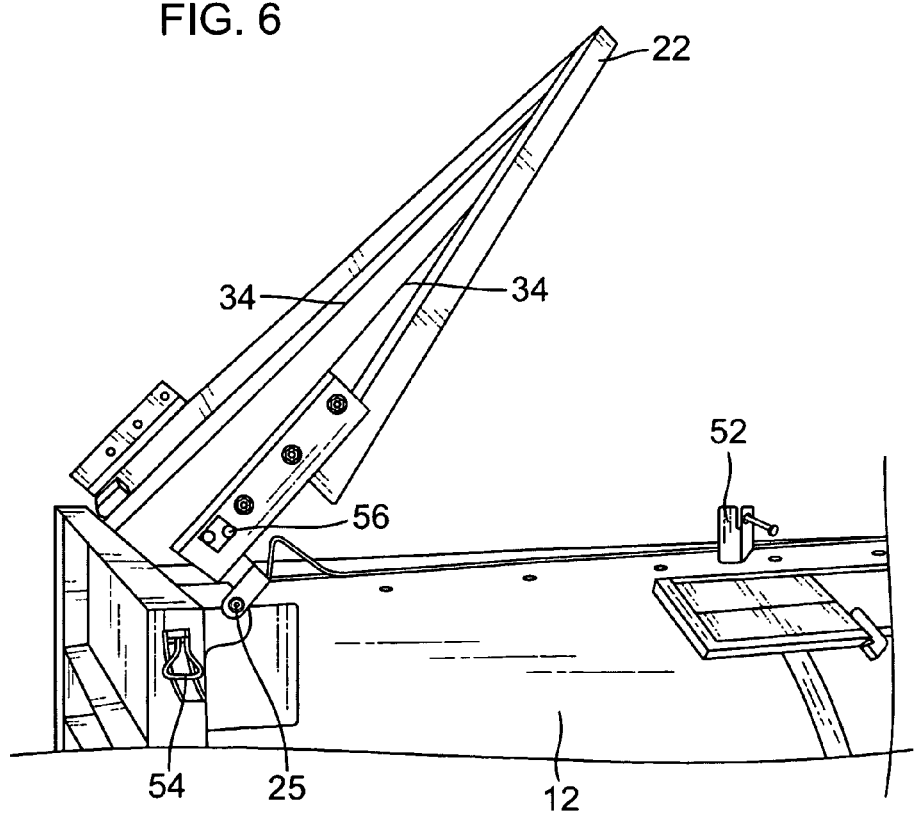
FIG. 8 is a detail view of an "A"-frame used with the present invention in a partially collapsed condition.

The "A"-frame 22 is collapsible by pivoting around pivot point 25 as shown in FIG. 8. The "A"-frame 22 may then be laid to rest on the cylindrical shell 12 and securely latched to cylindrical shell 12 with latch 52. When the "A"-frame 22 is in the upright vertical position, the "A"-frame 22 can be secured in this position by using a clamp 54 which clamps on to member 56 as shown in FIG. 8.

Figure 9:
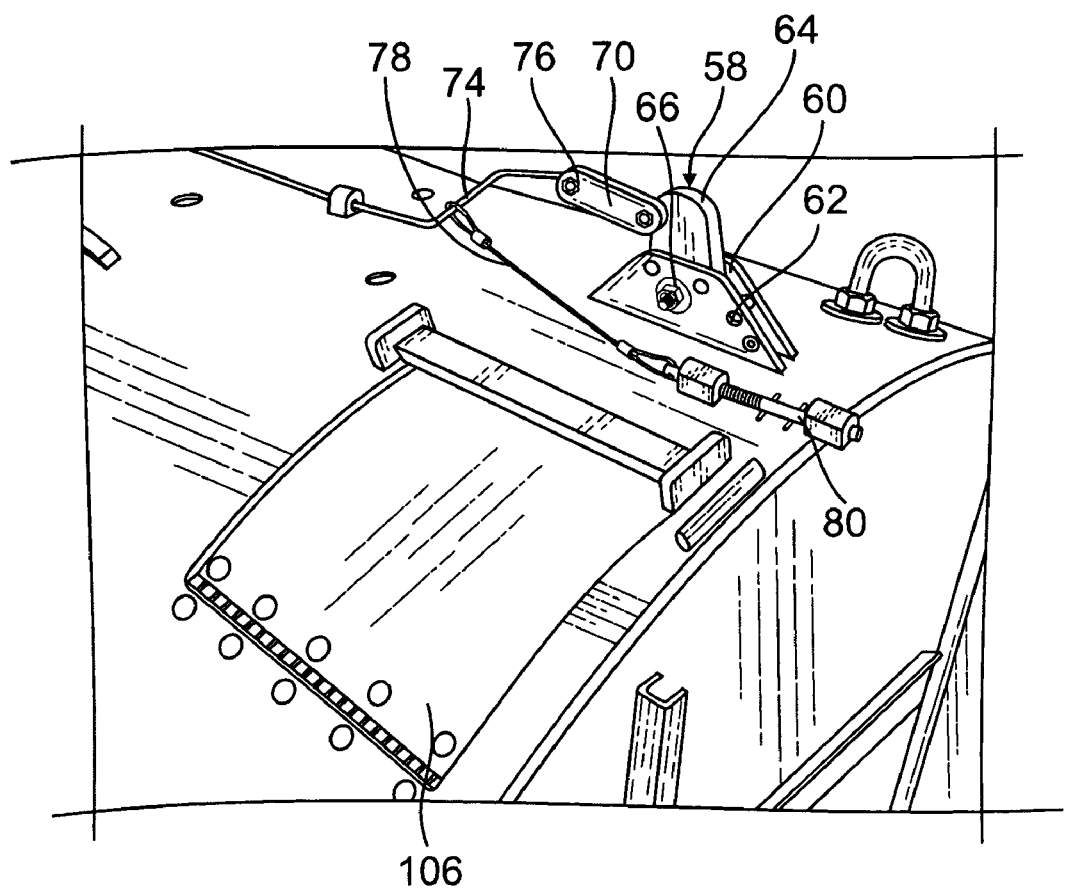
FIG. 9 is a partial view of a trigger assembly and bait door used with the present invention.
Figure 10:
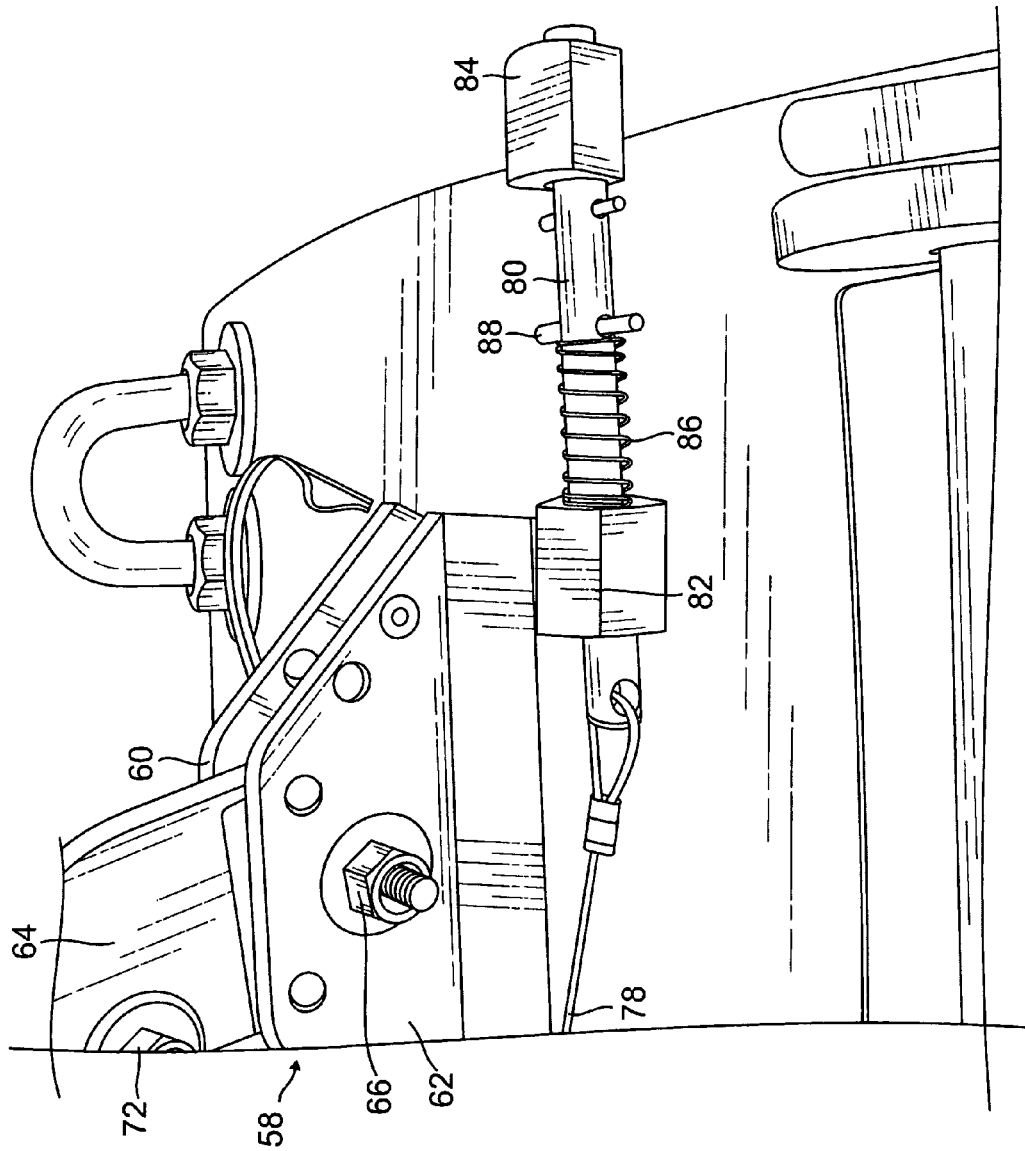
FIG. 10 is a detail view of the trigger assembly as shown in FIG. 9.
Figure 11:
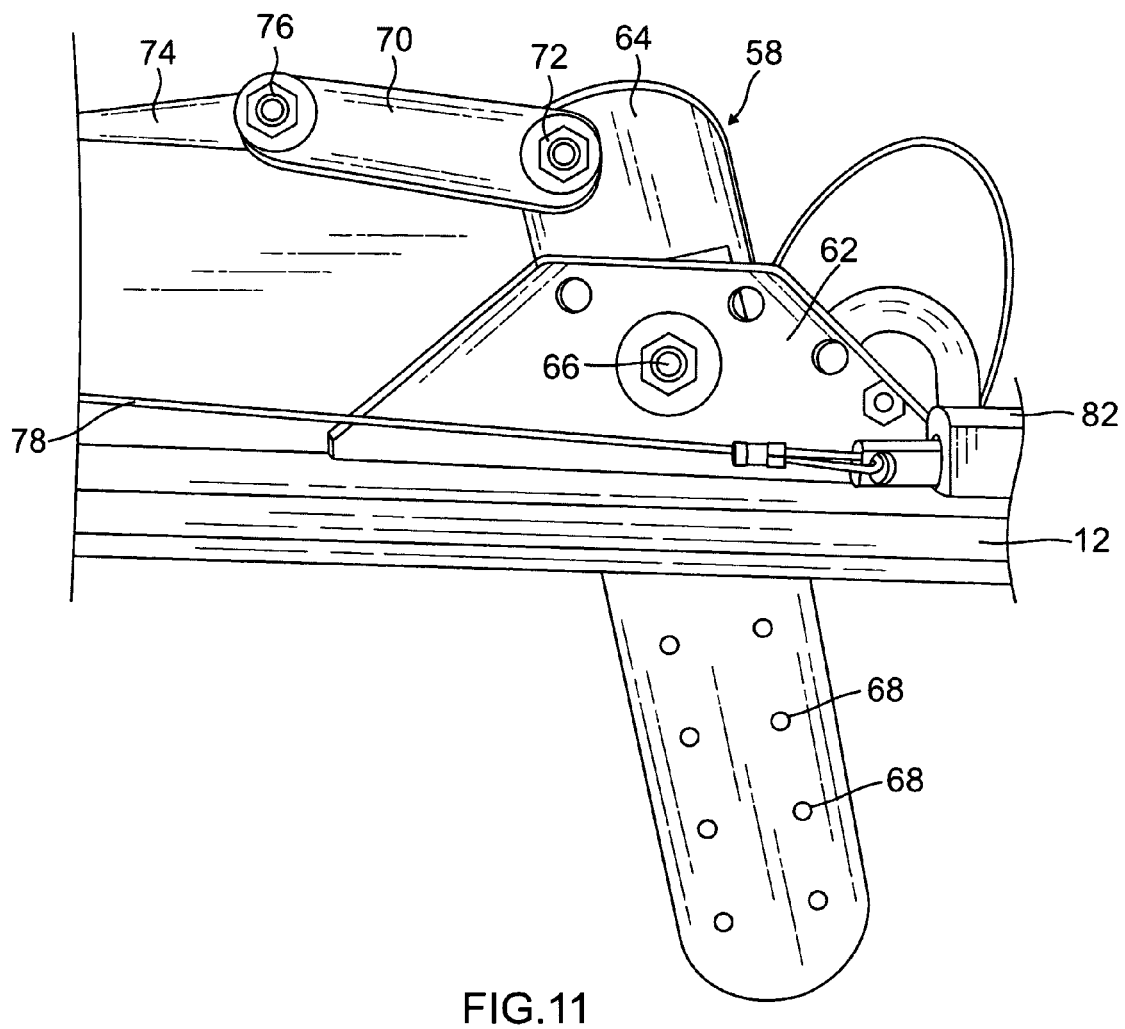
FIG. 11 is a detail view of the trigger assembly showing a trigger arm used with the present invention.

A trigger assembly 58 is shown in FIGS. 1 and 9-12. The trigger assembly 58 is used for dropping the front trap door 16 and the rear window panel 44 when an animal such as a bear enters the cylindrical shell 12. The trigger assembly 58 includes a pair of spaced apart support members 60 and 62 which pivotally support a trigger arm 64 with a bolt 66. The bottom of the trigger arm 64 extends into the interior of cylindrical 12 as shown in FIG. 11. The trigger arm 64 is provided with a series of holes 68 to which bait is secured.

A linkage member 70 is rotatably attached to the trigger arm 64 with bolt 72. The linkage member 70 is also rotatably connected to a trigger rod 74 with bolt 76. A cable 78 has one end secured to trigger rod 74 and has the opposite end connected to a bale rod 80. The bale rod 80 is supported by a pair of bearings 82 and 84. A compression spring 86 is mounted between the bearing 82 and a pin 88 mounted to the bale rod 80. The bale rod 80 has an extended portion 90 which extends beyond the bearing 84. The rear panel 44 has a hole 92 as shown in FIG. 5. When the rear panel 44 is moved upwardly, the extended portion 90 of bale rod 80 extends through the hole 92 thereby holding the rear door panel 44 in an upward position. When the extended portion 90 is retracted from the hole 92, the rear door panel 44 drops in channels 42 to the closed position. The compression spring 86 normally biases the bale rod 80 outwardly to an extended position.

Figure 13:
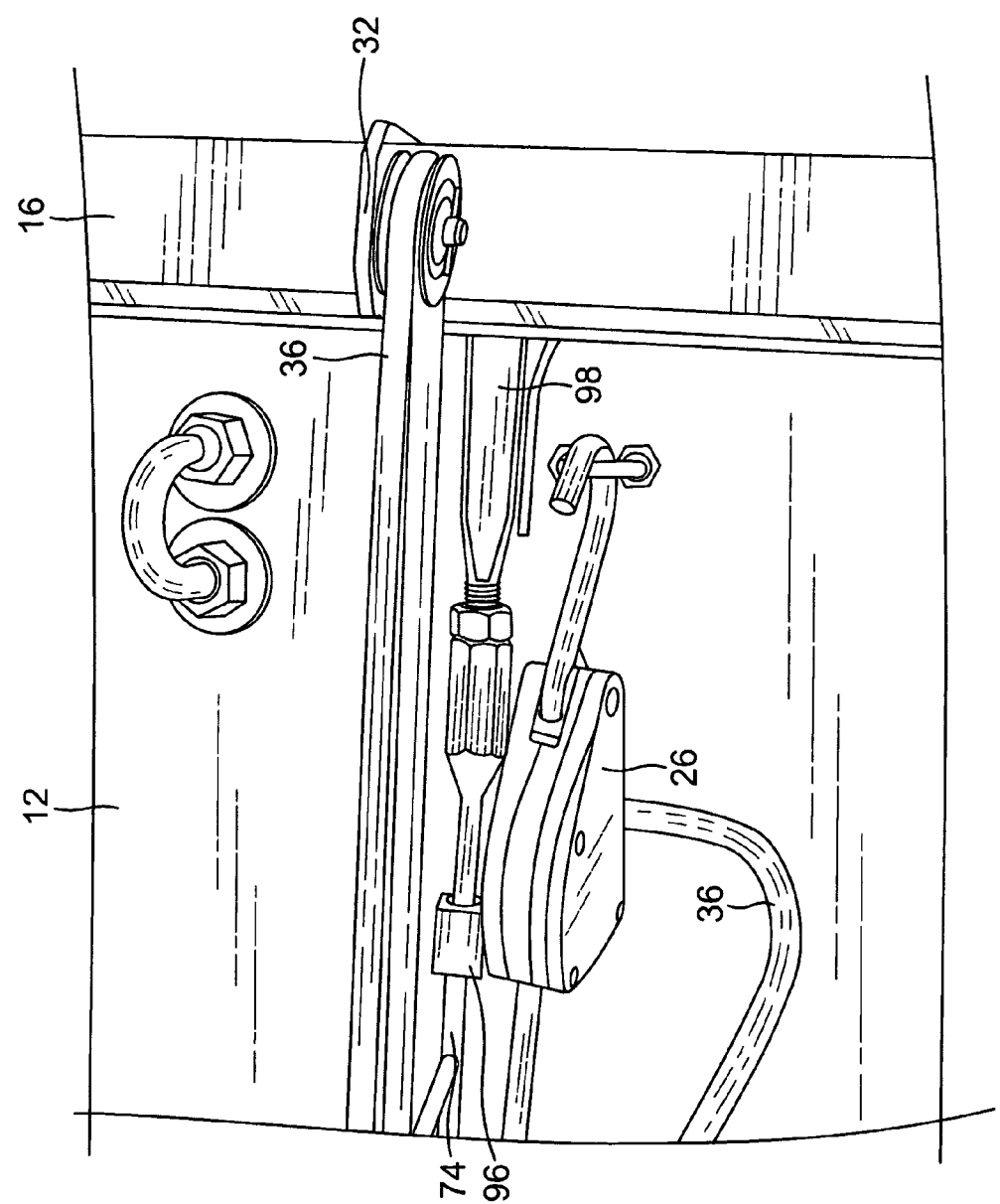
FIG. 13 is a partial top view of the bear trap shown in FIG. 1 adjacent to the trap door used with the present invention.
Figure 14:
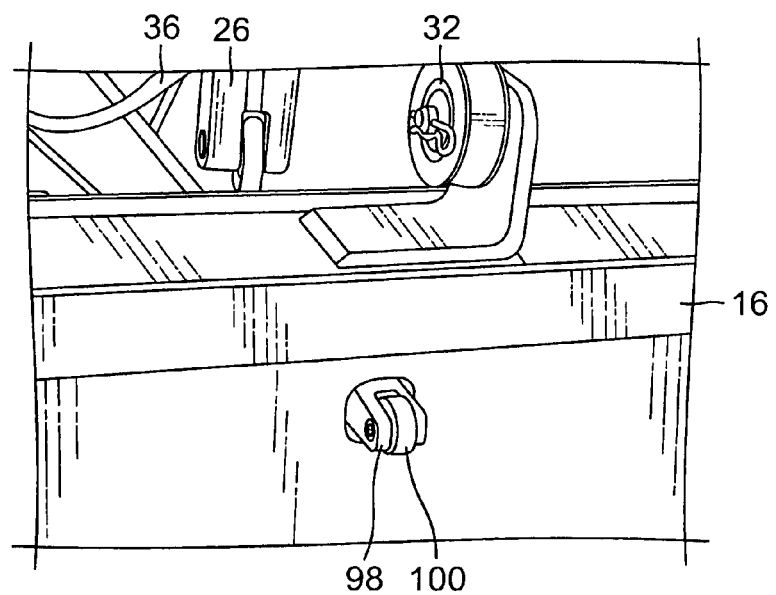
FIG. 14 is a right side view of the view shown in FIG. 13.
Figure 18:
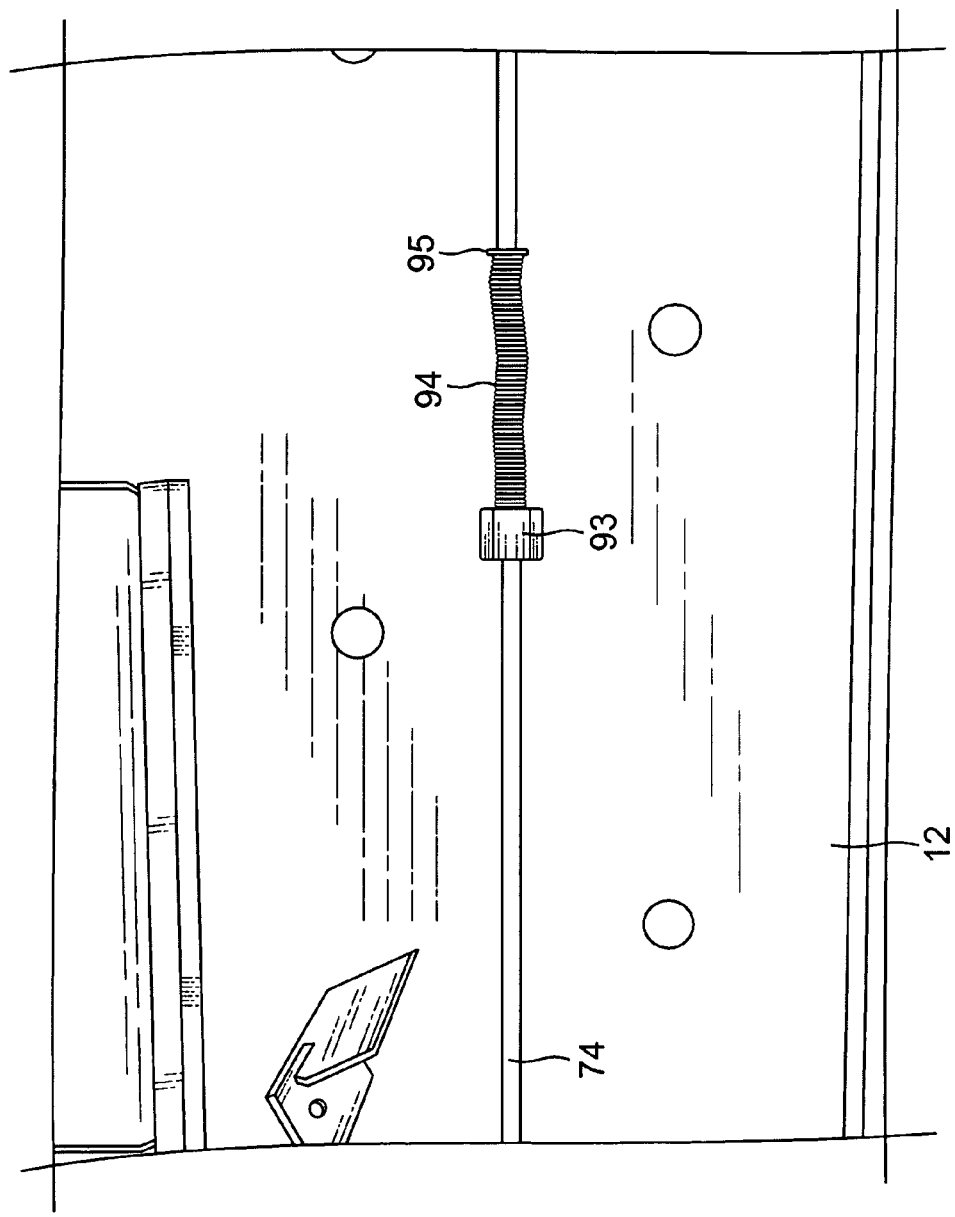
FIG. 18 is a detail view of a compression spring mounted on a trigger rod used with the present invention.

The trigger rod 74 extends to the front of the bear trap 10 along the top of the cylindrical shell 12 to the front of bear trap 10. The trigger rod 74 extends through a guide 93 as shown in FIG. 18. A bar 95 is mounted on trigger rod 74 and a compression spring 94 is positioned in surrounding relation with trigger rod 74 and extends between guide 93 and rod 95. The trigger rod 74 is then extended through bearing 96 as shown in FIG. 13, and has an end connected to a bale rod 98 as shown in FIG. 13. The end of bale rod 98 is provided with a roller bearing 100 as shown in FIG. 14. The compression spring 94 biases the bale rod 98 toward an outward position. When the trap door 16 is moved to the upward position as shown in FIG. 2, the bale rod 98 is positioned underneath trap door 16 and therefore holds the trap door 16 in the upper position. When the bale rod 98 is retracted, the trap door 16 falls downwardly within the channels 20. The roller bearing 100 allows the bale rod 98 to move up the panel 18 with less friction. In the lower position the bale rod 98 extends through a hole 102 provided in the trap door 16 as shown in FIG. 2.

Figure 12:
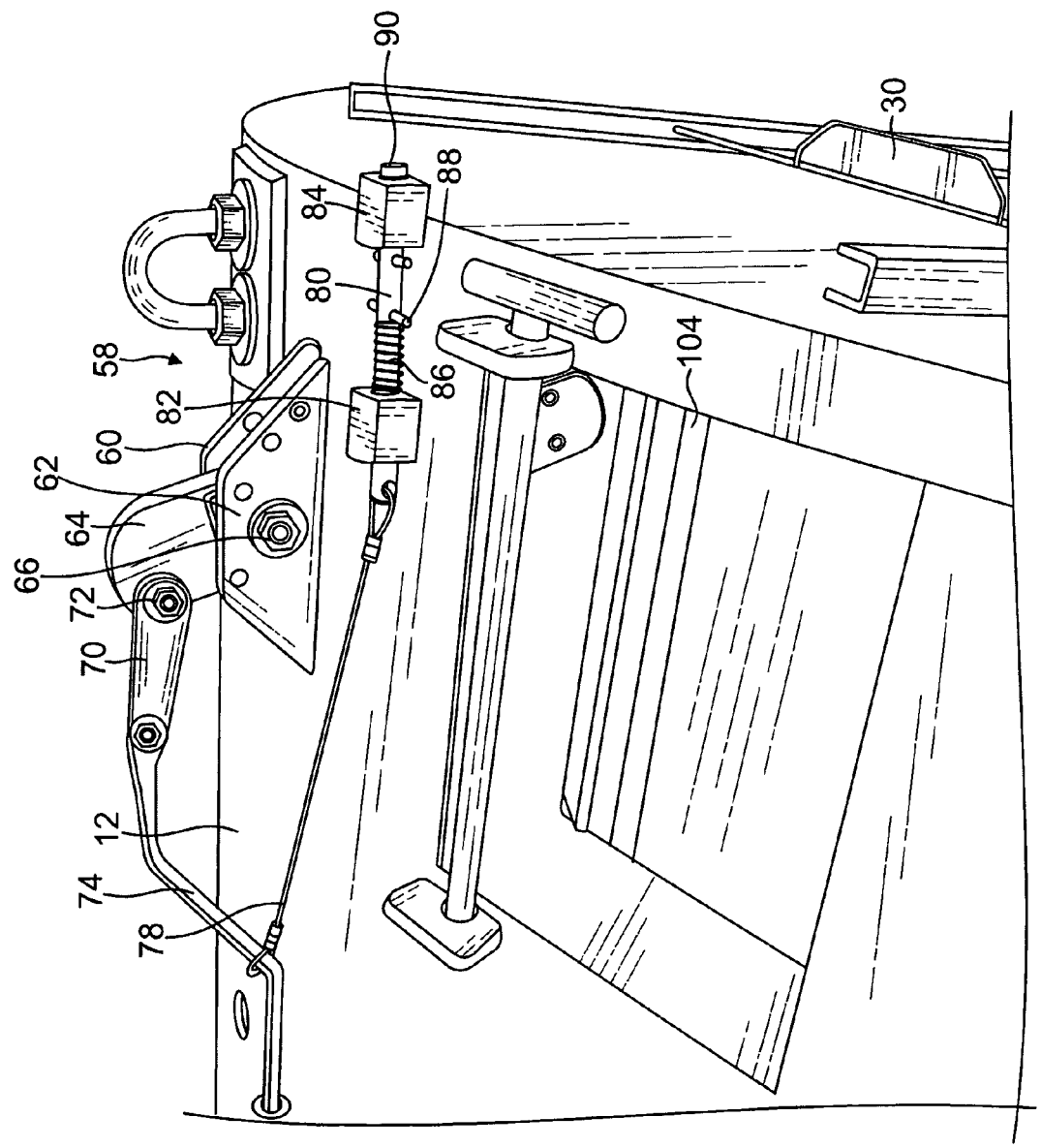
FIG. 12 is a partial top view of the bear trap, bait door, and trigger assembly shown in FIG. 1.

In setting the trap, the trap door 16 is pulled to the position shown in FIG. 2 with the rope 34 and the bale rod 98 allowed to extend underneath the trap door 16 thereby holding the trap door 16 in the upward position. The rear window panel 44 is moved upwardly to the position shown in FIG. 5 with the bale rod 80 extending through the hole 92 as shown in FIG. 5. Next, bait is attached to the trigger arm 64 as shown in FIG. 11. An access opening 104 is provided to allow a person outside the cylindrical shell to attach the bait to the trigger arm 64 as shown in FIG. 12. The access opening 104 has a hingedly attached cover plate 106 which is used to cover and lock the access opening 104 when not in use as shown in FIG. 9.

When a bear enters the cylindrical shell 12 and feeds on the bait attached to trigger arm 64, the upper portion of trigger arm 64 is rotated clockwise to the right from the position as shown in FIG. 11 causing the trigger rod 74 to also move to the right. At the same time, the bale rod 98 is pulled to the left as shown in FIG. 13 against the bias force of spring 94 releasing the door 16 to fall to the closed position. Once the trap door is closed the bait is released, the trigger rod 74 moves back to the right as shown in FIG. 13 under the bias force of spring 94 so that bale rod 98 moves into hole 102 provided in trap door 16 to secure the trap door 16 in the closed position. As shown in FIGS. 9 and 10, when the trigger rod 74 is moved to the left by spring 94, the cable 78 is pulled, thereby retracting the trigger rod 80 against the bias force of spring 86, which allows the rear window panel 44 to fall in channels 42.

Figure 15:
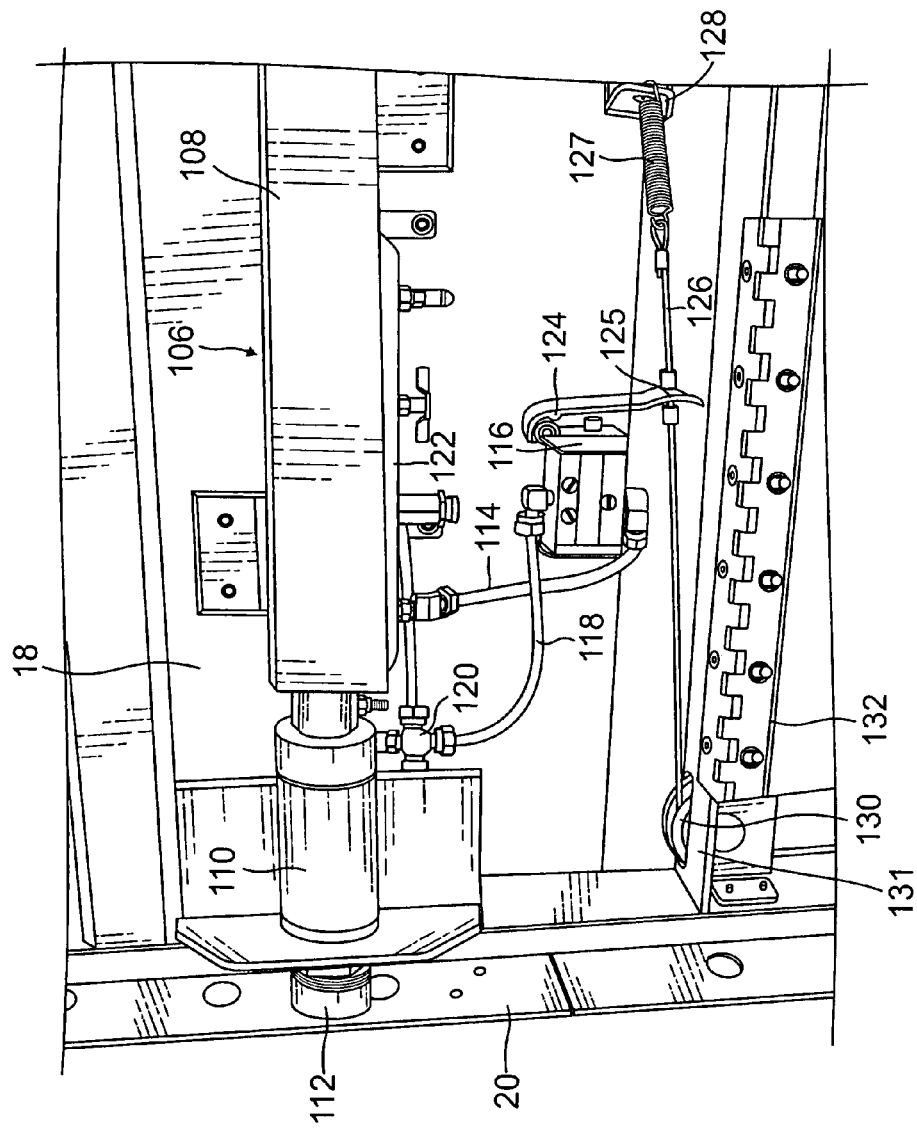
FIG. 15 is a partial detail view of a safety lock assembly used with the present invention.
Figure 16:
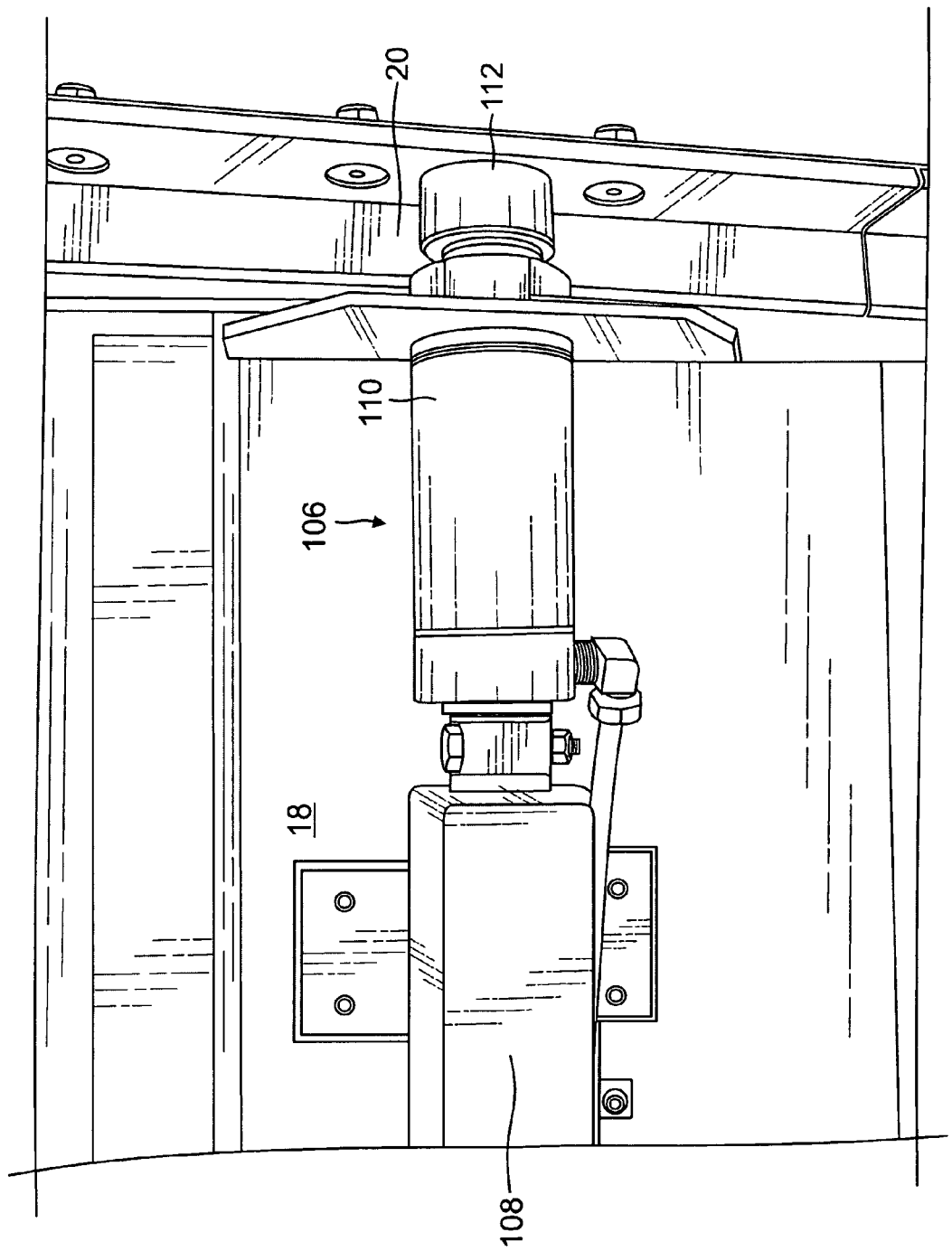
FIG. 16 is a partial detail view of another portion of the safety lock assembly used with the present invention.

A safety lock assembly is shown in FIG. 2 and also FIGS. 15 and 16. The safety lock assembly includes a compressed air supply reservoir 108 mounted to the panel 18. Further, a pair of pneumatic cylinders 110 are also mounted to the panel 18. Each of the pneumatic cylinders 110 have a piston shaft (not shown) which has a brake pad element 112 mounted at an end thereof as shown in FIGS. 15 and 16. The pneumatic cylinders have a conventional internal spring (not shown) which biases the pneumatic cylinder piston in a retracted position.

The pneumatic cylinders 110 are positioned to enable the brake pad 112 to be jammed into engagement with channel 20 when the pneumatic piston shaft is moved to an extended position.

Figure 19:
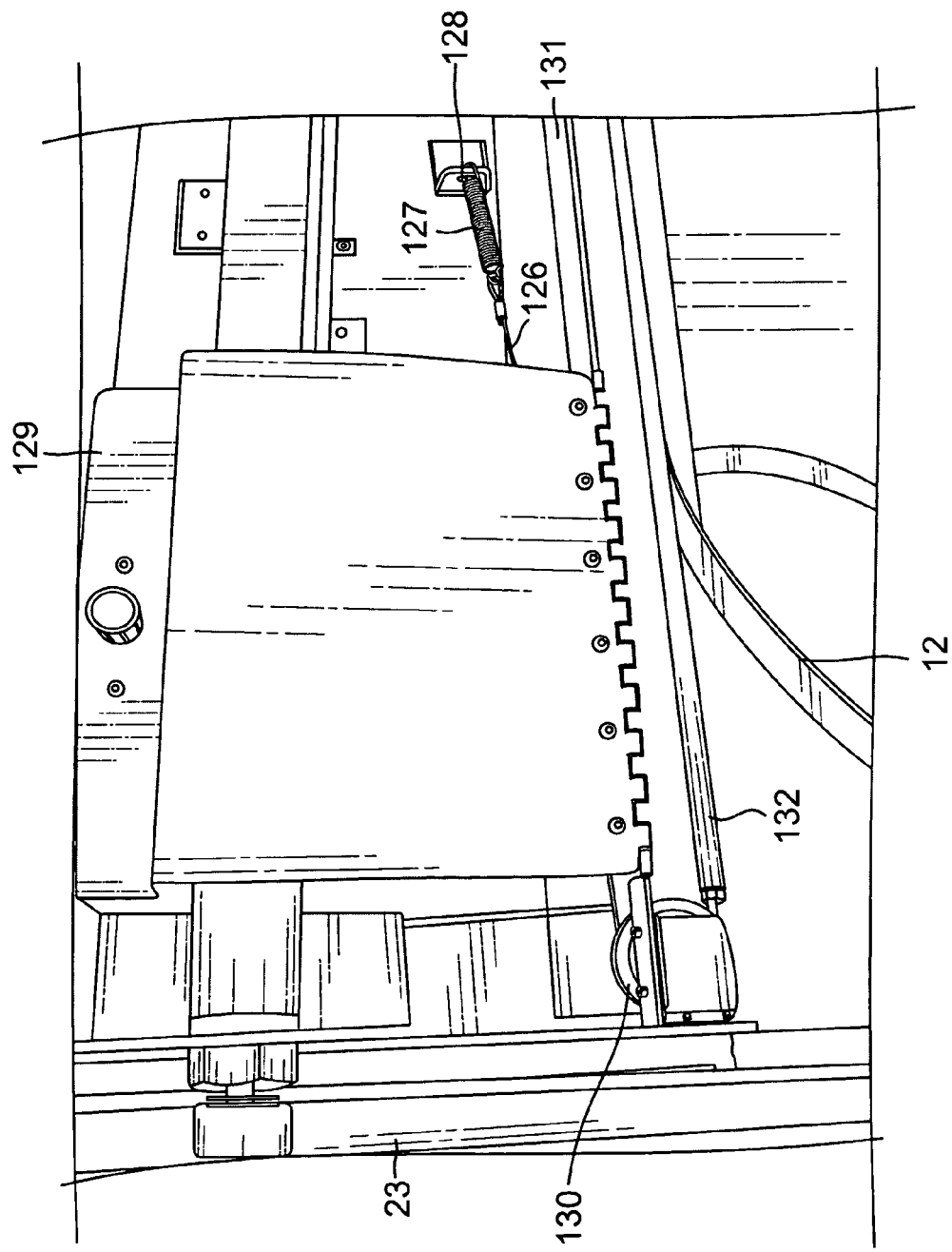
FIG. 19 is a detail view of a safety lock trigger assembly used with the present invention.

The reservoir 108 is connected with a pneumatic hose 114 to a pneumatic valve 116 as shown in FIG. 15. An output hose 118 is connected to a "T" fitting 120. One branch of the "T" fitting 120 is connected to the pneumatic cylinder 110 and the other branch of the "T" fitting 120 is connected to a hose 122 which is, in turn, connected to the other pneumatic cylinder 110 as shown in FIG. 16. A safety lock trigger assembly is shown in FIGS. 15 and 19. This safety lock trigger assembly includes the valve 116 which has a switch arm 124 with an end secured to a cable 126 at 125 as shown in FIG. 15. An end of the cable 126 is connected to a compression spring 127 which in turn is connected to the panel 18 at 128 as shown in FIGS. 15 and 19. A cover 129 may be used to protect the valve 116 as shown in FIG. 19. The cable 126 is fed around a pulley 130 and then threaded through a tube 132 which extends along the width of door panel 18 as shown in FIGS. 2 and 19. The free end of cable 126 is then attached to a side frame of trap door 16 as shown in FIG. 2. The pulley 130 is mounted to a bottom wall 131 of trap door 16 and has a portion extending below bottom wall 131 as shown in FIG. 19.

In operation, the safety lock trigger assembly is actuated when an object is in the entrance of the cylindrical shell 12 and the trap door 16 is being lowered. When this occurs, the object in the entrance forces the tube 132 upwardly causing the cable 126 to move to the left as shown in FIG. 15. This causes the switch arm 124 to move the valve 116 to a position to allow compressed air to enter the pneumatic cylinders 110 thereby driving the brake pads 112 against the channel 20 which stops further downward movement of the trap door 16. Once the object is removed, the cable 126, mounted to panel 18 with a spring 127, moves to the right under the influence of the spring 127 causing the arm 124 to switch the valve 116 the deactivated position where compressed air is shut off from the pneumatic cylinders 110. The internal spring of the pneumatic cylinders return the brake pads 112 to the retracted position thereby allowing the trap door 16 to continue to drop.

Figure 17:
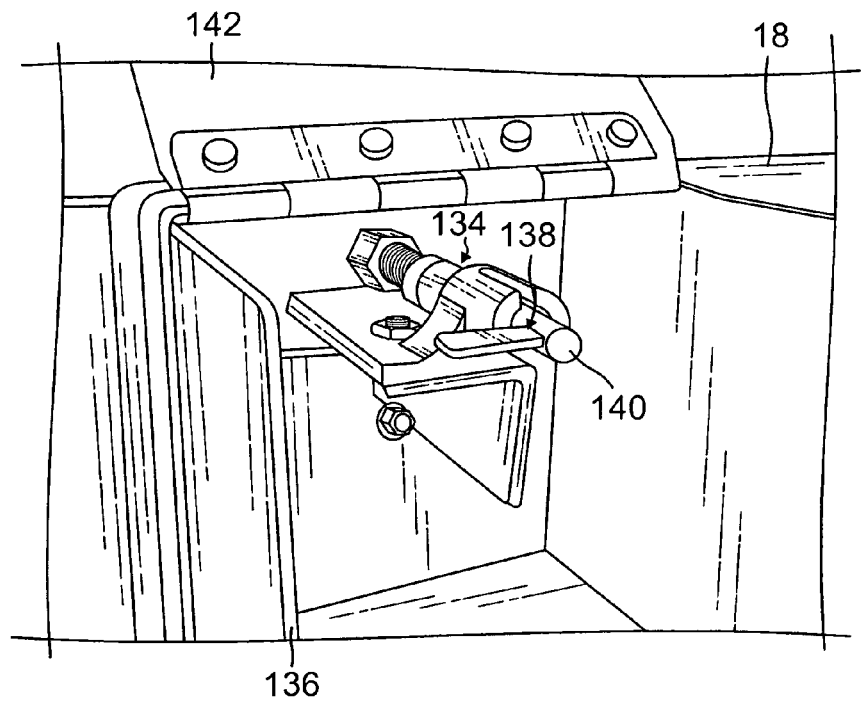
FIG. 17 is a detail view of a secure lock assembly used with the present invention.

A secure lock assembly 134, as shown in FIG. 17, is mounted in a lock box 136 as shown in FIGS. 4 and 17. The secure lock assembly 134 (not shown), includes a conventional spring biased latch 138 which moves a rod 140 into a hole provided in the trap door panel 18. When rod 140 is in the hole provided in panel 18, the trap door 16 is prevented from moving upwardly. The lock box 136 is provided with a hinged cover 142 which is used to cover the secure lock assembly 134 to prevent the trap door from being opened by unauthorized personnel when a bear is in the cylindrical shell 12. The cover 142 can be locked with a padlock, for example.

When it is desired to release the bear from the trap, the rope 34 is pulled to raise the trap door 16. This can be done at a safe distance from the trap 10 without the necessity of having a person raise the trap door directly near the front end opening, where a live animal can scratch or bite.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A large animal trap comprising:
   a horizontally disposed hollow cylindrical shell having a longitudinal axis and having an opening at a front end and an end wall closing an opposite rear end;
   a pair of upright channel guides disposed in parallel relation on either lateral side of the opening and having vertical channel openings facing one another;
   a substantially rectangular trap door having upper, lower and side extremities and adapted to travel vertically from an upper position to a lower position with the side extremities slidably fitted within the channel openings;
   the trap door when positioned in the lower position adapted to close the front end opening;
   an "A" frame disposed on the outside surface of the upper wall of the cylindrical shell adjacent the front end opening with an apex of the "A" frame located above the longitudinal axis of the cylindrical shell;
   a pulley mounted to the apex of the "A" frame;
   a rope having one end secured to the upper extremity of the trap door;
   the rope threaded upwardly from the upper extremity of the trap door and through the pulley leaving a free end of the rope which may be pulled to lift the trap door;
   a trip rod disposed on an outside surface of an upper wall of the cylindrical shell and mounted for slidable movement parallel to the longitudinal axis of the cylindrical shell from an extended position where the trip rod extends underneath the lower extremity of the trap door to a retracted position where the trip rod is drawn away from the lower extremity of the trap door;
   a compression spring for biasing the trip rod toward the extended position;
   a holder for holding bait located inside the hollow cylindrical shell adjacent to the end wall of the cylindrical shell; and
   an elongate trigger arm having a first end connected to the bait holder and having a second end extending through the upper wall of the cylindrical shell;
   the second end of the trigger arm arranged to pivot toward the rear end of the cylindrical shell when an animal seizes the bait; and
   the trigger arm rigidly connected to the trip rod whereby when the second end of the trigger arm is pivoted toward the rear end of the cylindrical shell the trip rod is moved to the retracted position thereby releasing the trap door to fall under the influence of gravitational force.

2. The large animal trap according to claim 1 wherein the "A" frame is hingedly mounted to the cylindrical shell and movable from an upright position to a collapsed position lying flat on the outside surface of the upper wall of the cylindrical shell.

3. A large animal trap comprising:
   a horizontally disposed hollow cylindrical shell having a longitudinal axis and having an opening at a front end and an end wall closing an opposite rear end;
   a pair of upright channel guides disposed in parallel relation on either lateral side of the opening and having vertical channel openings facing one another;
   a substantially rectangular trap door having upper, lower and side extremities and adapted to travel vertically from an upper position to a lower position with the side extremities slidably fitted within the channel openings;
   the trap door when positioned in the lower position adapted to close the front end opening;
   a trip rod disposed on an outside surface of an upper wall of the cylindrical shell and mounted for slidable movement parallel to the longitudinal axis of the cylindrical shell from an extended position where the trip rod extends underneath the lower extremity of the trap door to a retracted position where the trip rod is drawn away from the lower extremity of the trap door;
   a compression spring for biasing the trip rod toward the extended position;
   a holder for holding bait located inside the hollow cylindrical shell adjacent to the end wall of the cylindrical shell;
   an elongate trigger arm having a first end connected to the bait holder and having a second end extending through the upper wall of the cylindrical shell;
   the second end of the trigger arm arranged to pivot toward the rear end of the cylindrical shell when an animal seizes the bait;
   the trigger arm rigidly connected to the trip rod whereby when the second end of the trigger arm is pivoted toward the rear end of the cylindrical shell the trip rod is moved to the retracted position thereby releasing the trap door to fall under the influence of gravitational force;

a pneumatic cylinder having a pneumatic piston movable from an extended position to a retracted position;

the pneumatic cylinder mounted to the trap door and positioned with the pneumatic piston extendable into one of the vertical channel openings when the pneumatic piston is in the extended position;

a brake pad mounted to a free end of the pneumatic piston;

a spring means for biasing the pneumatic cylinder toward the retracted position;

a pneumatic valve for selectively directing compressed air from a reservoir to the pneumatic cylinder to move the pneumatic piston to the extended position against the bias of the spring means; and a trigger means positioned below the lower extremity of the trap door and connected to the pneumatic valve for moving the pneumatic piston to the extended position when the trap door is falling and an object located in the opening at the front end of the cylindrical shell pushes the trigger means upwardly.

* * * * *